(12) United States Patent
Guo et al.

(10) Patent No.: US 9,819,013 B2
(45) Date of Patent: Nov. 14, 2017

(54) SULFUR-CARBON COMPOSITE FOR LITHIUM-SULFUR BATTERY, THE METHOD FOR PREPARING SAID COMPOSITE, AND THE ELECTRODE MATERIAL AND LITHIUM-SULFUR BATTERY COMPRISING SAID COMPOSITE

(75) Inventors: Yuguo Guo, Beijing (CN); Sen Xin, Beijing (CN); Nahong Zhao, Shanghai (CN); Longjie Zhou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 840 days.

(21) Appl. No.: 14/361,337

(22) PCT Filed: Nov. 29, 2011

(86) PCT No.: PCT/CN2011/083151
§ 371 (c)(1),
(2), (4) Date: May 29, 2014

(87) PCT Pub. No.: WO2013/078618
PCT Pub. Date: Jun. 6, 2013

(65) Prior Publication Data
US 2014/0342234 A1     Nov. 20, 2014

(51) Int. Cl.
H01M 4/36      (2006.01)
H01M 4/58      (2010.01)
H01M 4/587     (2010.01)
H01M 4/133     (2010.01)
H01M 4/136     (2010.01)
H01M 10/052    (2010.01)
H01M 4/583     (2010.01)
C01B 31/02     (2006.01)
B82Y 30/00     (2011.01)
B82Y 40/00     (2011.01)

(52) U.S. Cl.
CPC .............. *H01M 4/364* (2013.01); *B82Y 30/00* (2013.01); *B82Y 40/00* (2013.01); *C01B 31/0253* (2013.01); *H01M 4/133* (2013.01); *H01M 4/136* (2013.01); *H01M 4/581* (2013.01); *H01M 4/583* (2013.01); *H01M 4/587* (2013.01); *H01M 10/052* (2013.01); *C01P 2006/12* (2013.01); *C01P 2006/14* (2013.01); *C01P 2006/16* (2013.01); *H01M 4/5815* (2013.01)

(58) Field of Classification Search
CPC .... H01M 10/052; H01M 4/133; H01M 4/136; H01M 4/364; H01M 4/581; H01M 4/5815; H01M 4/583; H01M 4/587; C01P 2006/12; C01P 2006/14; C01P 2006/16; C01B 31/0253; B82Y 30/00; B82Y 40/00
See application file for complete search history.

(56) References Cited

U.S. PATENT DOCUMENTS

2011/0281156 A1    11/2011    Boren et al.

FOREIGN PATENT DOCUMENTS

| CN | 101712468 | 5/2010 |
|---|---|---|
| CN | 102110849 | 6/2011 |
| CN | 102142554 A | 8/2011 |
| EP | 1662597 A1 | 5/2006 |
| WO | 2009114314 A2 | 9/2009 |
| WO | 2011028804 | 3/2011 |

OTHER PUBLICATIONS

Juchen Guo et al: "Sulfur-Impregnated Disorered Carbon Nanotubes Cathode for Lithium-Sulfur Batteries", Nano Letters, vol. 11, No. 10, Oct. 12, 2011, pp. 4288-4294.
Ji X et al: "A highly ordered nanostructured carbon-sulphur cathode for lithium-sulphur batteries", Nature Materials, vol. 8, No. 6, Jun. 2009, pp. 500-506, Macmillan Publishers Limited.
C. Lai et al: "Synthesis and Electrochemical Performance of Sulfur/Highly Porous Carbon Composites", Journal of Physical Chemistry, vol. 113, No. 11, Mar. 19, 2009, pp. 4712-4716.
International Search Report for Application No. PCT/CN2011/083151 dated Sep. 6, 2012 (3 pages).
Nam et al., "Preparation of Mesoporous Carbon-Carbon Nanotube Composites Using the Template Method," Journal of Nanoscience and Nanotechnology, vol. 11, No. 7, pp. 5761-5768, Jul. 2011.

*Primary Examiner* — Carlos Barcena
(74) *Attorney, Agent, or Firm* — Michael Best & Friedrich LLP (57) ABSTRACT

The present invention relates to a sulfur-carbon composite made from microporous-carbon-coated carbon nanotube (CNT@MPC) composites, in particular a sulfur-carbon composite, which comprises a carbon-carbon composite substrate (CNT@MPC) and sulfur loaded into said carbon-carbon composite substrate (CNT@MPC); as well as a method for preparing said sulfur-carbon composite, an electrode material and a lithium-sulfur battery comprising said sulfur-carbon composite.

22 Claims, 5 Drawing Sheets

Fig. 1 SEM image of the CNT@MPC composite

Fig. 2 Microstructure of a CNT@MPC nanowire (TEM image)

Fig. 3 Micropores on a CNT@MPC nanowire (HR-TEM image)

Fig. 4 Sulfur-carbon composite made from the CNT@MPC composite (TEM image, S% = 33 wt%)

Fig. 5 Elemental mapping of the sulfur-carbon composite (S% = 33 wt%)

Fig. 6 Cycling performance of the sulfur-carbon composite (S% = 33 wt%) at a discharge-charge rate of 0.1C Fig. 7 Cycling performances of the sulfur-carbon composite (S% = 33 wt%) at different discharge-charge rates Fig. 8 Cycling performance of the sulfur-carbon composite (S% = 60 wt%) at a discharge-charge rate of 0.1C Fig. 9 Cycling performances of the sulfur-carbon composite (S% = 60 wt%) at different discharge-charge rates

SULFUR-CARBON COMPOSITE FOR LITHIUM-SULFUR BATTERY, THE METHOD FOR PREPARING SAID COMPOSITE, AND THE ELECTRODE MATERIAL AND LITHIUM-SULFUR BATTERY COMPRISING SAID COMPOSITE

TECHNICAL FIELD

The present invention relates to a sulfur-carbon composite made from microporous-carbon-coated carbon nanotube (CNT@MPC) composites, in particular a sulfur-carbon composite, which comprises a carbon-carbon composite substrate (CNT@MPC) and sulfur loaded into said carbon-carbon composite substrate (CNT@MPC); as well as a method for preparing said sulfur-carbon composite, an electrode material and a lithium-sulfur battery comprising said sulfur-carbon composite.

BACKGROUND ART

Lithium-sulfur (Li/S) batteries have a theoretical capacity nearly one magnitude higher than that of LiFePO$_4$. Nevertheless, the Li/S system has not yet been implemented in many applications because the following problems still need to be solved before sulfur cathode materials can be practically used in rechargeable lithium batteries: 1) particle size of sulfur should be made as fine as possible to ensure a high utilization rate of sulfur and then a high reversible capacity upon cycling; 2) discharge products of poly-sulfides should be carefully restrained from dissolving into electrolyte to ensure long cycle life; and 3) conductivity of the cathode material should be enhanced to ensure a better rate performance.

It is well-known that carbon nanotubes (CNTs) show excellent electric conductivity, however, their relatively smooth surface makes it difficult to load sulfur. On the other hand, a sulfur-carbon composite always suffers from the problem of dissolution of polysulfides into the electrolyte, which may cause capacity fade during cycling.

SUMMARY OF INVENTION

It is therefore an object of the present invention to provide a high-energy-density Li—S battery with improved electrochemical performance, which makes it possible to solve the above problems.

This object is achieved by a sulfur-carbon composite, which comprises a carbon-carbon composite substrate (CNT@MPC) and sulfur loaded into said carbon-carbon composite substrate (CNT@MPC), characterized in that said carbon-carbon composite substrate (CNT@MPC) is formed by carbon nanotubes (CNTs) and a microporous carbon (MPC) coating layer applied onto the surface of the carbon nanotubes (CNTs).

According to another aspect of the invention, a method for preparing a sulfur-carbon composite is provided, which includes the following steps:

1) providing an aqueous suspension of carbon nanotubes (CNTs);
2) adding one or more carbon sources into said aqueous suspension of carbon nanotubes (CNTs);
3) carbonizing said one or more carbon sources by a hydrothermal reaction, so as to apply a microporous carbon (MPC) coating layer onto the surface of the carbon nanotubes (CNTs) to form a carbon-carbon composite substrate (CNT@MPC);
4) annealing said carbon-carbon composite substrate (CNT@MPC);
5) loading sulfur into said carbon-carbon composite substrate (CNT@MPC) to give a sulfur-carbon composite.

According to another aspect of the invention, an electrode material is provided, which comprises the sulfur-carbon composite according to the present invention.

According to another aspect of the invention, a lithium-sulfur battery is provided, which comprises the sulfur-carbon composite according to the present invention.

BRIEF DESCRIPTION OF DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF PREFERRED EMBODIMENTS

The present invention relates to a sulfur-carbon composite, which comprises a carbon-carbon composite substrate (CNT@MPC) and sulfur loaded into said carbon-carbon composite substrate (CNT@MPC), characterized in that said carbon-carbon composite substrate (CNT@MPC) is formed by carbon nanotubes (CNTs) and a microporous carbon (MPC) coating layer applied onto the surface of the carbon nanotubes (CNTs).

In the sulfur-carbon composite according to the present invention, the microporous carbon (MPC) coating layer has a BET specific surface area of 500-900 m$^2$/g, preferably 600-800 m$^2$/g; a pore volume of 0.3-3.0 cm$^3$/g, preferably 1.0-3.0 cm$^3$/g, more preferably 1.3-2.5 cm$^3$/g; and an average pore diameter of 0.4-1.0 nm, preferably 0.5-0.7 nm.

Such microporous structure is beneficial to enhance the utilization of sulfur, and also helps to limit the dissolution of polysulfides into electrolytes, and thus improves the cyclic stability of sulfur.

The microporous carbon (MPC) coating layer has a thickness of 30-150 nm, preferably about 40 nm, 60 nm, 80 nm, 100 nm, 120 nm, 130 nm, or 140 nm.

In the sulfur-carbon composite according to the present invention, sulfur is finely dispersed in the microporous carbon (MPC) coating layer, preferably at a nano-scale level or even a molecular scale level (considering the diameter of a single $S_8$ molecule is around 0.7 nm), which ensures a high electrochemical activity and utilization of sulfur.

The carbon nanotubes (CNTs) which can be used in the sulfur-carbon composite according to the present invention have a diameter of 5-100 nm, preferably about 10 nm, 30 nm, 40 nm, 60 nm, or 80 nm. The length of the carbon nanotubes (CNTs) used here is not particularly limited, for example less than 5 μm, 5-15 μm, or more than 15 μm.

There is no limit to the specific form of the carbon nanotubes (CNTs) used here. Single-walled carbon nanotubes (SWNTs), double-walled carbon nanotubes (DWNTs) and multi-walled carbon nanotubes (MWNTs) are usable, but multi-walled carbon nanotubes (MWNTs) are preferred.

The sulfur-carbon composite according to the present invention has a sulfur load amount of 20-90 wt %, preferably 25-80 wt %, more preferably 30-75 wt %, most preferably 33-60 wt %, in each case based on the total weight of the sulfur-carbon composite.

In the sulfur-carbon composite according to the present invention, the carbon-carbon composite substrate (CNT@MPC) has a coaxial cable-like structure.

The present invention further relates to a method for preparing a sulfur-carbon composite, which includes the following steps:

1) providing an aqueous suspension of carbon nanotubes (CNTs);

2) adding one or more carbon sources into said aqueous suspension of carbon nanotubes (CNTs);

3) carbonizing said one or more carbon sources by a hydrothermal reaction, so as to apply a microporous carbon (MPC) coating layer onto the surface of the carbon nanotubes (CNTs) to form a carbon-carbon composite substrate (CNT@MPC);

4) annealing said carbon-carbon composite substrate (CNT@MPC);

5) loading sulfur into said carbon-carbon composite substrate (CNT@MPC) to give a sulfur-carbon composite.

1) Provision of an Aqueous Suspension of Carbon Nanotubes (CNTs)

In the method for preparing a sulfur-carbon composite according to the present invention, the carbon nanotubes (CNTs) are optionally pretreated by dilute nitric acid before step 1). A person skilled in the art can easily select a suitable concentration of the dilute nitric acid, for example 3-6 M (mol/L), and can also easily select a suitable duration of such a pretreatment, for example about 8-14 h, preferably about 11-13 h, most preferably about 12 h. The dilute nitric acid can be used in an excessive amount, preferably more than 100 mL per 100 mg carbon nanotubes (CNTs), more preferably more than 200 mL per 100 mg carbon nanotubes (CNTs), and most preferably more than 300 mL per 100 mg carbon nanotubes (CNTs).

In step 1) of the method of the present application, the carbon nanotubes (CNTs) are dispersed preferably by ultrasonication in an aqueous solution of a surfactant at a temperature of 20-80° C., preferably at room temperature or a temperature of 40-60° C., to form a suspension. A suitable concentration of the aqueous solution of the surfactant can be $0.5 \times 10^{-3}$-$3 \times 10^{-3}$ M, preferably $1 \times 10^{-3}$-$2 \times 10^{-3}$ M. Moreover, the aqueous solution of the surfactant can be used in an amount of 10-100 mL per 100 mg carbon nanotubes (CNTs), preferably 20-70 mL per 100 mg carbon nanotubes (CNTs).

The carbon nanotubes (CNTs) which can be used in step 1) of the method of the present application have a diameter of 5-100 nm, preferably about 10 nm, 30 nm, 40 nm, 60 nm, or 80 nm. The length of the carbon nanotubes (CNTs) used here is not particularly limited, for example less than 5 μm, 5-15 μm, or more than 15 μm.

There is no limit to the specific form of the carbon nanotubes (CNTs) used in step 1). Single-walled carbon nanotubes (SWNTs), double-walled carbon nanotubes (DWNTs) and multi-walled carbon nanotubes (MWNTs) are usable, but multi-walled carbon nanotubes (MWNTs) are preferred.

The surfactant used here can be selected from the group consisting of an anionic surfactant, such as sodium dodecyl benzene sulfonate (SDBS), oleic acid, sodium Lauryl sulfonate (SLS), and sodium dodecyl sulfate (SDS); a cationic surfactant, such as cetyl trimethyl ammonium bromide; and a nonionic surfactant, such as polyvinyl pyrrolidone (PVP), polyoxyethylenesorbitan monopalmitate (TWEEN-40), and polyoxyethylenesorbitan monooleate (TWEEN-80).

2) Addition of One or More Carbon Sources into Said Aqueous Suspension

As the carbon source(s) used in step 2), carbohydrates can be used, which are preferably selected from the group consisting of fructose, D-glucose, sucrose and their mixtures.

Moreover, the amount of the one or more carbon sources used can be easily determined by a person skilled in the art based on the expected thickness of the microporous carbon (MPC) coating layer, which may be 30-150 nm, preferably about 40 nm, 60 nm, 80 nm, 100 nm, 120 nm, 130 nm, or 140 nm. Preferably, the one or more carbon sources can be used in an amount of 1-10 g per 100 mg carbon nanotubes (CNTs), more preferably 2-7 g per 100 mg carbon nanotubes (CNTs).

3) Carbonization

In step 3) of the method of the present application, the aqueous suspension containing the carbon nanotubes (CNTs) and the carbon source(s) is sealed preferably in an autoclave and heated at a temperature of 140-200° C., preferably 150-170° C., more preferably about 160° C., for 5-30 h, preferably 10-25 h, more preferably about 20 h, to carbonize the carbon sources, so as to apply a microporous carbon (MPC) coating layer onto the surface of the carbon nanotubes (CNTs) and form a carbon-carbon composite substrate (CNT@MPC).

After step 3) and before step 4), the carbon-carbon composite substrate (CNT@MPC) is optionally washed preferably with de-ionized water and dried preferably in an oven at 40-60° C., for example, overnight.

4) Annealing

In step 4) of the method of the present application, the carbon-carbon composite substrate (CNT@MPC) is annealed at a temperature of 700-1000° C., preferably 750-900° C., in an inert atmosphere for 2-6 h, preferably 3-5 h, more preferably about 4 h, with a heating rate of 1-5° C./min, preferably 2-4° C./min, more preferably 2-3° C./min. The inert atmosphere can be provided by nitrogen, argon, or any other inert gases commonly used.

The microporous carbon (MPC) coating layer formed after step 4) has a BET specific surface area of 500-900 m²/g, preferably 600-800 m²/g; a pore volume of 0.3-3.0 cm³/g, preferably 1.0-3.0 cm³/g, more preferably 1.3-2.5 cm³/g; and an average pore diameter of 0.4-1.0 nm, preferably 0.5-0.7 nm. Such microporous structure is beneficial to enhance the utilization of sulfur, and also helps to limit the dissolution of polysulfides into electrolytes, and thus improves the cyclic stability of sulfur.

The microporous carbon (MPC) coating layer formed after step 4) has a thickness of 30-150 nm, preferably about 40 nm, 60 nm, 80 nm, 100 nm, 120 nm, 130 nm, or 140 nm.

5) Load of Sulfur

And then, in step 5) of the method according to the present application, the carbon-carbon composite substrate (CNT@MPC) is mixed with sulfur in an appropriate mass ratio preferably in a quartz mortar to yield a homogeneous mixture, sealed preferably in a glass container and heated at a temperature of 120-190° C., preferably 130-180° C., more preferably 140-170° C., for 3-21 h, preferably 5-20 h, more preferably 6-18 h, so as to finely disperse sulfur into the microporous carbon (MPC) coating layer. After heating, the composite can be naturally cooled down to room temperature to yield a black powder-like final product.

There is no limit to the specific form of sulfur used here. As sulfur melts when heated, even bulk sulfur is also usable, but sulfur powder is preferred. The particle size of sulfur powder is not limited either.

Moreover, the appropriate mass ratio ($m_S:m_C$) between sulfur and the carbon-carbon composite substrate (CNT@MPC) can be easily determined by a person skilled in the art based on the sulfur load amount expected. Preferably, the mass ratio ($m_S:m_C$) between sulfur and the carbon-carbon composite substrate (CNT@MPC) can be in a range of 1:4-9:1 (corresponding to a sulfur load amount of 20-90 wt %), more preferably 1:3-4:1 (corresponding to a sulfur load amount of 25-80 wt %), even more preferably 3:7-3:1 (corresponding to a sulfur load amount of 30-75 wt %), most preferably 1:2-3:2 (corresponding to a sulfur load amount of 33-60 wt %).

After step 5), sulfur is finely dispersed in the microporous carbon (MPC) coating layer, preferably at a nano-scale level or even a molecular scale level (considering the diameter of a single $S_8$ molecule is around 0.7 nm), which ensures a high electrochemical activity and utilization of sulfur.

The sulfur-carbon composite formed after step 5) has a sulfur load amount of 20-90 wt %, preferably 25-80 wt %, more preferably 30-75 wt %, most preferably 33-60 wt %, in each case based on the total weight of the sulfur-carbon composite.

The present invention further relates to an electrode material, which comprises the sulfur-carbon composite according to the present invention.

The present invention further relates to a lithium-sulfur battery, which comprises the sulfur-carbon composite according to the present invention.

Through forming a microporous carbon (MPC) coating layer on the surface of CNTs to obtain a carbon-carbon composite substrate (CNT@MPC) with a coaxial cable-like structure, and introducing sulfur into such a substrate, the problems stated at the beginning can be solved: 1) & 3) CNT cores can act as both rigid frameworks and electric conductors to construct an electrically conductive network, and thereby the utilization rate of sulfur can be raised and the rate performance of the composites can be improved; 2) the microporous carbon coating layer, with its large specific surface area and pore volume, can store and disperse a large amount of sulfur, while the microporous structure can restrain polysulfides from dissolving into the electrolyte, and thereby a good cycling performance can be achieved.

Potential applications of the composite according to the present invention include high-energy-density lithium ion batteries with acceptable high power density for energy storage applications, such as power tools, photovoltaic cells and electric vehicles.

The following non-limiting examples illustrate various features and characteristics of the present invention, which is not to be construed as limited thereto.

Figure 1:
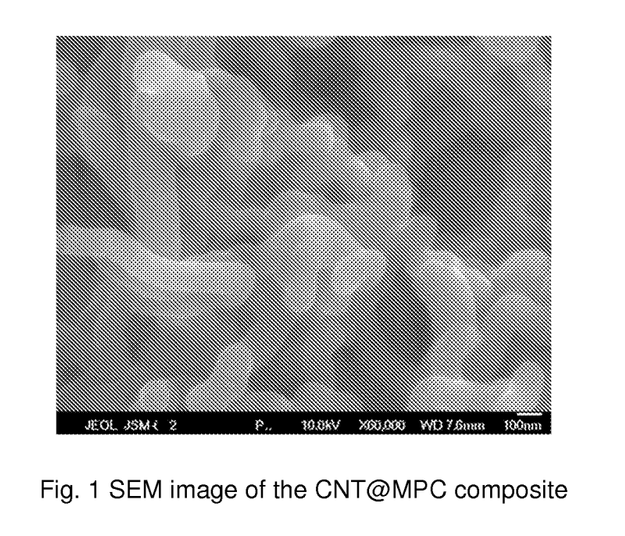
FIG. 1 is a Scanning Electron Microscopy (SEM) image of the carbon-carbon composite substrate (CNT@MPC) according to the present invention.
Figure 2:
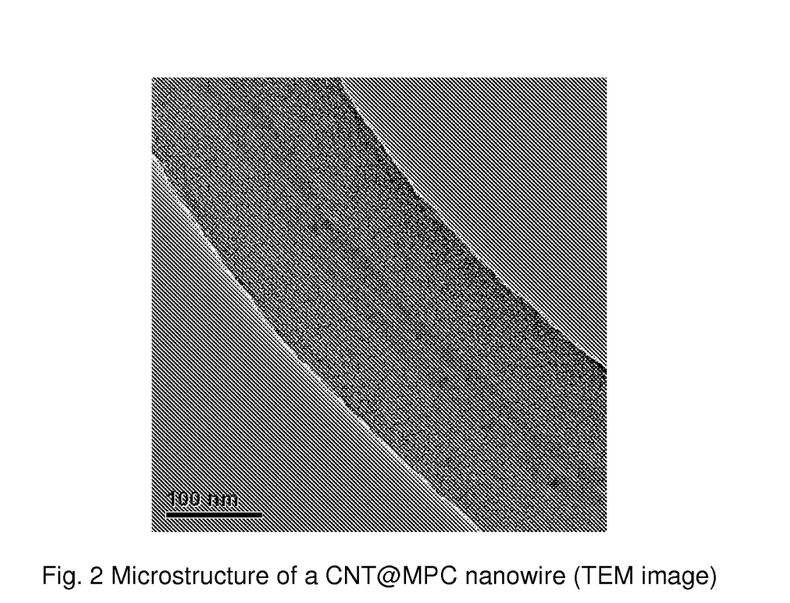
FIG. 2 is a Transmission Electron Microscopy (TEM) image of the carbon-carbon composite nanowire (CNT@MPC) according to the present invention showing its microstructure.
Figure 3:
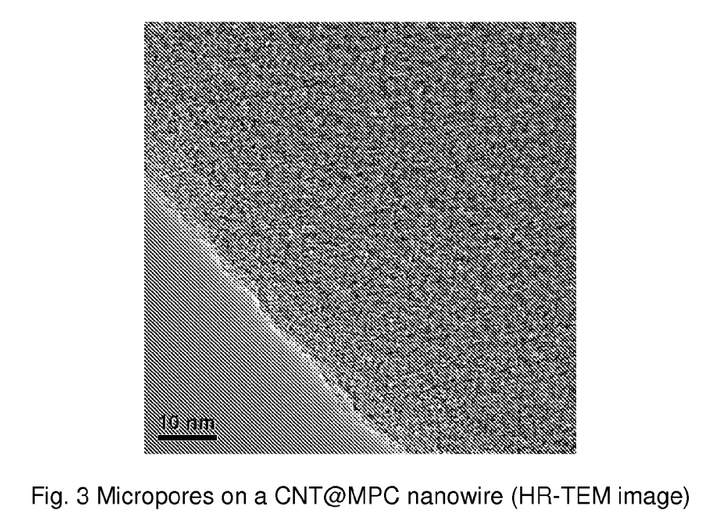
FIG. 3 is a High-Resolution Transmission Electron Microscopy (HR-TEM) image of the carbon-carbon composite nanowire (CNT@MPC) according to the present invention showing its micropores.

EXAMPLE A 50 mg of multi-walled carbon nanotubes (product name L.MWNTs-4060, Shenzhen Nanotech Port Co., Ltd., Guangdong, China, with a purity of >95%, a diameter of 40-60 nm, and a length of 5-15 μm) were firstly pretreated by 100 mL of dilute nitric acid (3M) for 12 h, and then were dispersed by ultrasonication in 10 mL of SDS (AR grade, Sinopharm Chemical Reagent Co., Ltd.) aqueous solution ($1 \times 10^{-3}$ M) at 40° C. to form a black suspension. Then, 1 g D-glucose (AR grade, Sinopharm Chemical Reagent Co., Ltd.) was added into the suspension. The suspension was sealed in an autoclave and heated at 160° C. for 20 h to form the CNT@MPC composite. After being washed with de-ionized water and dried in an oven at 50° C. overnight, said CNT@MPC composites were further annealed at 750° C. in a nitrogen atmosphere for 4 h with a heating rate of 3° C./min to further carbonize the carbon coating layer. The CNT@MPC composite thus obtained had a diameter of 160-220 nm (thickness of carbon coating layer: 60-80 nm as shown in FIG. 1 to FIG. 3), a BET specific surface area of 625 m²/g, a total pore volume of 1.32 cm³/g, and an average pore diameter of 0.75 nm.

Figure 4:
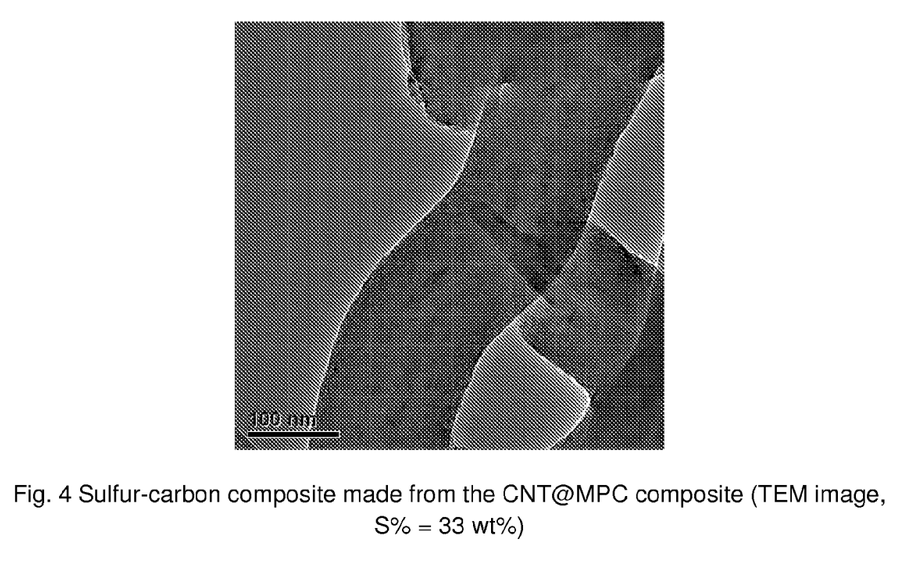
FIG. 4 is a TEM image of the sulfur-carbon composite prepared from the carbon-carbon composite substrate (CNT@MPC) according to the present invention (S %=33 wt %)
Figure 5:
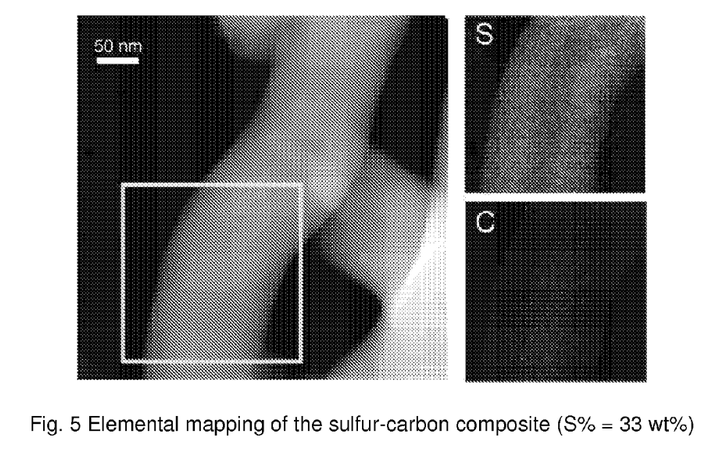
FIG. 5 is the elemental mapping of the sulfur-carbon composite according to the present invention (S %=33 wt %)

In order to prepare the sulfur-carbon composite with a sulfur load amount of 33 wt %, sulfur powder (Aldrich with a purity of >99.995%) was firstly mixed with the CNT@MPC composite by a mass ratio ($m_S:m_C$) of 1:2, then the mixture was sealed in a glass container and heated at 145° C. for 6 h to obtain the sulfur-carbon composite (FIG. 4 and FIG. 5). After heating, the composite was naturally cooled down to room temperature to yield a black powder-like final product.

Electrochemical measurements were performed with coin cells assembled in an argon-filled glovebox. For preparing working electrodes, a mixture of active material, carbon black, and poly-(vinyl difluoride) (PVDF) at a weight ratio of 70:20:10 was pasted on an Aluminum foil. Lithium foil was used as the counter electrode. A glass fiber sheet (GF/D, Whatman) was used as a separator. The electrolyte (product name LB-301, Zhangjiagang Guotai-Huarong New Chemical Materials Co., Ltd.) consisting of a solution of 1 M $LiPF_6$ salt in ethylene carbonate (EC)/dimethyl carbonate (DMC) (1:1 W/W) was used. Galvanostatic cycling of the assembled cells was carried out using a battery testing system in the voltage range of 1-3 V (vs $Li^{+/Li}$).

Figure 6:
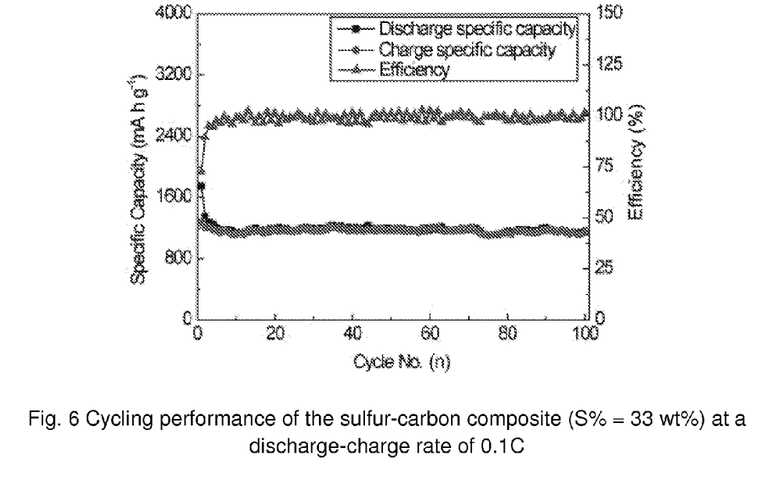
FIG. 6 is a plot showing the cycling performance of the sulfur-carbon composite according to the present invention (S %=33 wt %) at a discharge-charge rate of 0.1 C.
Figure 7:
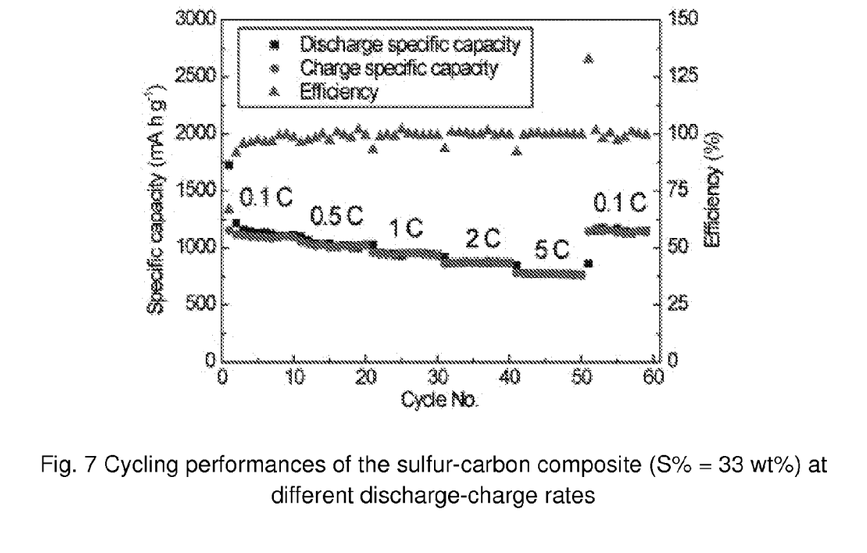
FIG. 7 is a plot showing the cycling performances of the sulfur-carbon composite according to the present invention (S %=33 wt %) at different discharge-charge rates.

The sulfur-carbon composite thus prepared can deliver a discharge capacity of 2140 mA·h·g⁻¹ and a reversible capacity of 1200 mA·h·g⁻¹ calculated based on the mass of sulfur (sulfur utilization rate of 72%), as well as a cycle life of up to 100 cycles. When discharge at 5 C (discharge within 20 min), the reversible capacity can still maintain 750 mA·h·g⁻¹ (FIG. 6 and FIG. 7).

FIGS. 1 and 2 showed typical microstructures of the CNT@MPC composite prepared according to Example A, in which FIG. 2 clearly showed the coaxial cable-like structure of the CNT@MPC nanowire. FIG. 3 showed the micropores on the CNT-MPC nanowire prepared according to Example A. FIGS. 4 and 5 respectively showed the microstructure and the elemental distribution of the sulfur-carbon composite prepared from said CNT@MPC composite according to Example A with a sulfur content of 33 wt %. FIGS. 6 and 7 respectively showed the cycling and rate performances of said sulfur-carbon composite prepared according to Example A with a sulfur content of 33 wt %.

EXAMPLE B 30 mg of multi-walled carbon nanotubes (product name L.MWNTs-60100, Shenzhen Nanotech Port Co., Ltd., Guangdong, China, with a purity of >95%, a diameter of 60-100 nm, and a length of 5-15 μm) were firstly pretreated by 100 mL of dilute nitric acid (6M) for 12 h, and then were dispersed by ultrasonication in 20 mL of PVP aqueous solution ($2 \times 10^{-3}$ M) at 60° C. to form a black suspension. Then, 2 g sucrose was added into the suspension. The suspension was sealed in an autoclave and heated at 160° C. for 20 h to form the CNT@MPC composite. After being washed with de-ionized water and dried in an oven at 50° C. overnight, said CNT@MPC composites were further annealed at 900° C. in a nitrogen atmosphere for 4 h with a heating rate of 2° C./min to further carbonize the carbon coating layer. The CNT@MPC composite thus obtained had a diameter of 300-360 nm (thickness of carbon coating layer: 120-130 nm), a BET specific surface area of 733 m$^2$/g, a total pore volume of 2.44 cm$^3$/g, and an average pore diameter of 0.49 nm.

In order to prepare the sulfur-carbon composite with a sulfur load amount of 60 wt %, sulfur powder (Aldrich with a purity of >99.995%) was firstly mixed with the CNT@MPC composite by a mass ratio ($m_S:m_C$) of 3:2, then the mixture was sealed in a glass container and heated at 165° C. for 18 h to obtain the sulfur-carbon composite. After heating, the composite was naturally cooled down to room temperature to yield a black powder-like final product.

Electrochemical measurements were performed in the same way as Example A. The sulfur-carbon composite thus obtained can deliver a discharge capacity of 1300 mA·h·g$^{-1}$ and a reversible capacity of 900 mA·h·g$^{-1}$ calculated based on the mass of sulfur (sulfur utilization rate of 54%), as well as a cycle life of up to 50 cycles. When discharge at 5 C (discharge within 20 min), the reversible capacity can still maintain 600 mA·h·g$^{-1}$ (FIG. 8 and FIG. 9).

Figure 8:
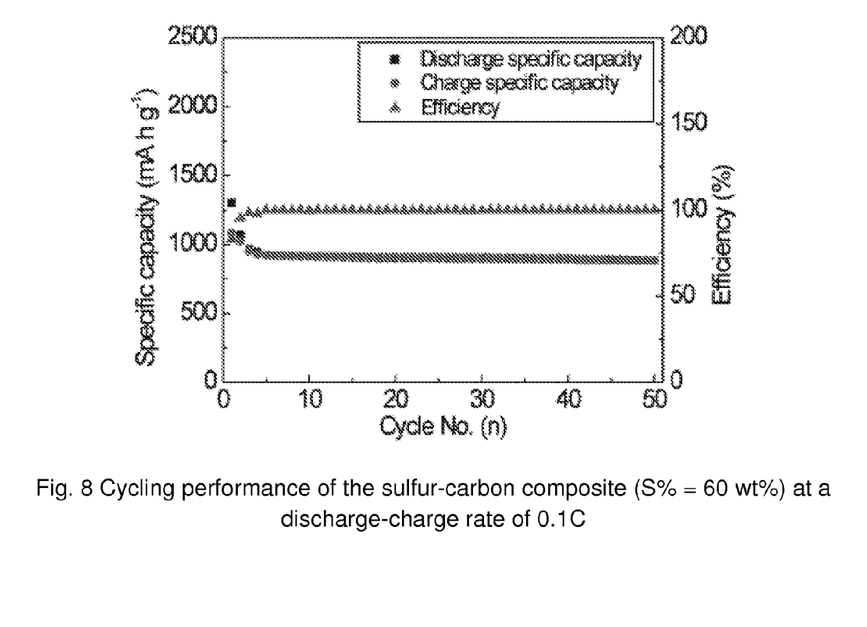
FIG. 8 is a plot showing the cycling performance of the sulfur-carbon composite according to the present invention (S %=60 wt %) at a discharge-charge rate of 0.1 C.
Figure 9:
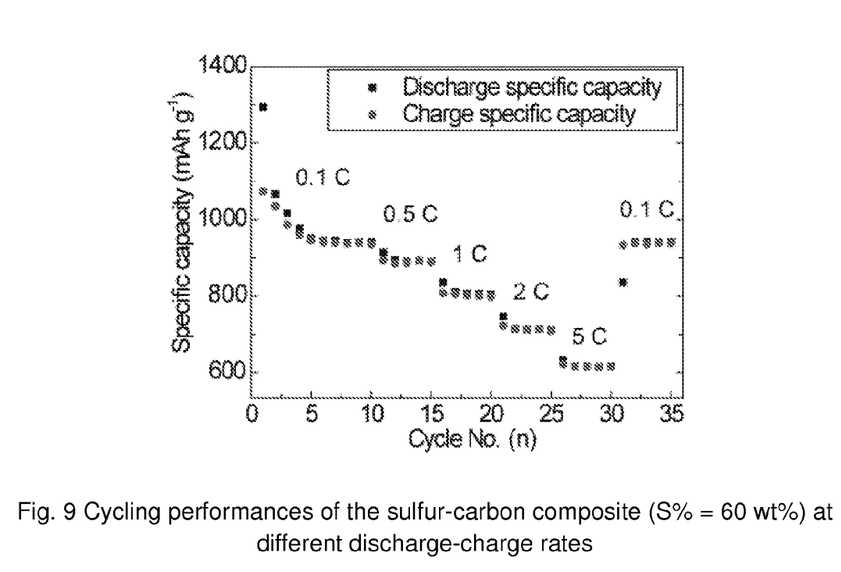
FIG. 9 is a plot showing the cycling performances of the sulfur-carbon composite according to the present invention (S %=60 wt %) at different discharge-charge rates.

FIGS. 8 and 9 respectively showed the cycling and rate performances of the sulfur-carbon composite prepared in accordance with Example B with a sulfur content of 60 wt %.

While certain embodiments have been described, these embodiments have been presented by way of example only, and are not intended to limit the scope of the inventions. The attached claims and their equivalents are intended to cover all the modifications, substitutions and changes as would fall within the scope and spirit of the invention.

The invention claimed is:

1. A sulfur-carbon composite, comprising a carbon-carbon composite substrate (CNT@MPC) and sulfur loaded into said carbon-carbon composite substrate (CNT@MPC), wherein said carbon-carbon composite substrate (CNT@MPC) is formed by carbon nanotubes (CNTs) and a microporous carbon (MPC) coating layer applied onto the surface of the carbon nanotubes (CNTs), wherein said carbon-carbon composite substrate (CNT@MPC) has a coaxial cable-like structure, and wherein sulfur is finely dispersed in said microporous carbon (MPC) coating layer.

2. The sulfur-carbon composite of claim 1, wherein said microporous carbon (MPC) coating layer has a BET specific surface area of 500-900 m$^2$/g.

3. The sulfur-carbon composite of claim 1, wherein said microporous carbon (MPC) coating layer has a pore volume of 0.3-3.0 cm$^3$/g.

4. The sulfur-carbon composite of claim 1, wherein said microporous carbon (MPC) coating layer has an average pore diameter of 0.4-1.0 nm.

5. The sulfur-carbon composite of claim 1, wherein said carbon nanotubes (CNTs) have a diameter of 5-100 nm.

6. The sulfur-carbon composite of claim 1, wherein said microporous carbon (MPC) coating layer has a thickness of 30-150 nm.

7. The sulfur-carbon composite of claim 1, wherein said sulfur-carbon composite has a sulfur load amount of 20-90 wt %, based on the total weight of said sulfur-carbon composite.

8. An electrode material, comprising the sulfur-carbon composite of claim 1.

9. A lithium-sulfur battery, comprising the sulfur-carbon composite of claim 1.

10. A method for preparing a sulfur-carbon composite, including the steps of:
  1) providing an aqueous suspension of carbon nanotubes (CNTs);
  2) adding one or more carbon sources into said aqueous suspension of carbon nanotubes (CNTs);
  3) carbonizing said one or more carbon sources by a hydrothermal reaction, so as to apply a microporous carbon (MPC) coating layer onto the surface of the carbon nanotubes (CNTs) and form a carbon-carbon composite substrate (CNT@MPC);
  4) annealing said carbon-carbon composite substrate (CNT@MPC); and
  5) loading sulfur into said carbon-carbon composite substrate (CNT@MPC) to give a sulfur-carbon composite.

11. The method of claim 10, wherein said carbon nanotubes (CNTs) are pretreated by dilute nitric acid before step 1).

12. The method of claim 10, wherein said aqueous suspension of carbon nanotubes (CNTs) is obtained by dispersing carbon nanotubes (CNTs) in an aqueous solution of a surfactant.

13. The method of claim 12, wherein said surfactant is selected from the group consisting of an anionic surfactant; a cationic surfactant; and a nonionic surfactant.

14. The method of claim 12, wherein said surfactant is selected from the group consisting of sodium dodecyl benzene sulfonate (SDBS), oleic acid, sodium lauryl sulfonate (SLS), and sodium dodecyl sulfate (SDS); cetyl trimethyl ammonium bromide; and polyvinyl pyrrolidone (PVP), polyoxyethylenesorbitan monopalmitate (TWEEN-40), and polyoxyethylenesorbitan monooleate (TWEEN-80).

15. The method of claim 10, wherein carbohydrates are used as said one or more carbon sources.

16. The method of any claim 10, wherein during step 3) said aqueous suspension containing the carbon nanotubes (CNTs) and carbon sources is sealed and heated at a temperature of 140-200° C. for 5-30 h.

17. The method of claim 10, wherein carbon-carbon composite substrate (CNT@MPC) is washed and dried after step 3) and before step 4).

18. The method of claim 10, wherein during step 4) said carbon-carbon composite substrate (CNT@MPC) is annealed at a temperature of 700-1000° C. in an inert atmosphere for 2-6 h with a heating rate of 1-5° C./min.

19. The method of claim 10, wherein during step 5) said carbon-carbon composite substrate (CNT@MPC) is mixed with sulfur, sealed and heated at a temperature of 120-190° C. for 3-21 h, so as to finely disperse sulfur into said microporous carbon (MPC) coating layer.

20. The method of claim 10, wherein carbohydrates are used as said one or more carbon sources, selected from the group consisting of fructose, D-glucose, sucrose and their mixtures.

21. An electrode material, comprising the sulfur-carbon composite prepared by the method of claim 10.

22. A lithium-sulfur battery, comprising the sulfur-carbon composite prepared by the method of claim 10.

* * * * *